United States Patent [19]

Madej

[11] 4,030,866

[45] June 21, 1977

[54] MOLDING APPARATUS

[75] Inventor: Edward A. Madej, Verona, Pa.

[73] Assignee: Robroy Industries, Verona, Pa.

[22] Filed: Nov. 24, 1975

[21] Appl. No.: 634,516

[52] U.S. Cl. .............................. 425/116; 249/83; 249/93; 425/117

[51] Int. Cl.² ...................................... B29C 27/14

[58] Field of Search ................. 249/83, 89, 93–97, 249/147–149, 177; 425/116–117, 392, 393, 395, 400

[56] References Cited

UNITED STATES PATENTS

| 536,204 | 3/1895 | Harrington | 249/87 |
| 1,264,618 | 4/1918 | Denning | 249/177 |
| 1,337,930 | 4/1920 | Lowe | 425/395 X |
| 2,129,680 | 9/1938 | Durant | 249/148 |
| 2,862,246 | 12/1958 | Sadler et al. | 249/96 |
| 3,355,772 | 12/1967 | Kolberg | 249/96 X |
| 3,499,067 | 3/1970 | Rogers | 425/117 X |
| 3,675,888 | 7/1972 | Scaramucci | 249/95 X |
| 3,771,764 | 11/1973 | Miyauchi | 249/95 X |

FOREIGN PATENTS OR APPLICATIONS

| 103,247 | 12/1925 | Germany | 249/87 |
| 428,246 | 11/1924 | Germany | 249/87 |

Primary Examiner—Robert L. Spicer, Jr.
Attorney, Agent, or Firm—Stanley J. Price, Jr.; John M. Adams

[57] ABSTRACT

A molding apparatus for applying a protective coating to an irregularly sized article includes a mold shell having upper and lower portions with mold cavities of a preselected configuration in each portion to receive the article, such as a threaded fitting or coupling, for coating. The shell upper and lower portions are secured together to position the cavities in overlying relation and surrounding the article. Openings extend through the shell portions into the overlying cavities to expose the end portions of the article. Seal members are advanced into the openings and are secured as by threaded engagement to the end portions of the article. The seal members seal the openings and position the article within the cavities to form an annulus surrounding the article as defined by the surface of the cavities. A fluid inlet extends through the shell and into the annulus. A moisture resistant, resilient, polymeric liquid, such as polyvinylchloride, is introduced through the inlet and fills the annulus surrounding the article. After curing the liquid is bonded to the outer surface of the article to form an insulating, moisture resistant, resilient polymeric coating. The coating terminates on the threaded end portion of the article in annular resilient flange portions as defined by the configuration of the seal members. The annular flange portions extend radially of the threaded end portions regardless of the length thereof so that connecting members threadedly engaged to the end portions of the article contact the annular flanges to effect an insulating and moisture resistant seal therebetween.

8 Claims, 3 Drawing Figures

MOLDING APPARATUS

BACKGROUND OF THE INVENTION

1. Field of the Invention

This invention relates to a molding apparatus and more particularly to a molding apparatus for forming an insulating, moisture resistant, resilient polymeric coating on the surface of an irregularly sized article.

2. Description of the Prior Art

In the art of conduit connectors, such as fittings, coupling devices and the like having threaded end portions to which conduits are secured and thereby joined with the connector, it is often desirable to coat the connector and a portion of the conduits with an insulating and moisture resistant material such as a polyvinylchloride (PVC) film. In many field applications the members are subjected to a corrosive environment where moisture can easily enter into a conduit connector. Furthermore, corrosive stray currents might pass through the conduit to the connector. Thus, an insulating and moisture resistant coating applied to the connector is necessary to protect the connector against galvanic and chemical corrosion.

Difficulties are encountered in applying an effective insulating, moisture resistant seal to a connector prior to installation. Subsequently, the seal must be effected after installation which initially exposes the connector and conduits to the corrosive atmosphere permitting moisture and dirt to enter into the connector and on the threaded ends of the connector and conduit. In many applications it is necessary to disassemble the conduits from the connector; and if a seal is formed on the members after assembly, the seal must be broken and reapplied. This procedure further exposes the connector and conduits to corrosive damage.

Power-coating and mold coating insulating, moisture resistant linings on conduit connectors have been suggested. In this manner, flange portions formed by end portions of the lining extend beyond the ends of the connector and flare outwardly. The conduits are threadedly advanced onto the ends of the connector and into contact with the flange portions to effect a fluid-tight seal between the connector and conduits. However, the connectors may vary in the size of the threaded end portions within the range of commercial connector tolerances. Therefore, it is difficult to provide a standard mold which can accommodate the range of tolerances that may occur to form an insulating, moisture resistant coating on the connector.

There is need for molding apparatus to form an insulating, moisture resistant coating on the surface of a conduit connector having threaded end portions which may vary in length within commercial tolerances to effect an insulating, moisture resistant seal between the connector and conduit members threadedly engaged thereto.

SUMMARY OF THE INVENTION

This invention relates to a molding apparatus for applying a protective coating to an irregularly sized article. The mold includes a shell having upper and lower portions. The upper and lower shell portions each have a cavity of a preselected configuration to receive the article for coating and an opening extending through the respective shell portions into the cavity. Connecting devices secure together the upper and lower shell portions to position the cavities in overlying relation and surrounding the article positioned within the cavities. Seal members extend through the openings in the upper and lower shell portions and seal the openings therein. The seal members are secured in abutting and surrounding relation with the end portions of the article. A fluid inlet extends through the shell into the cavities. A moisture resistant, resilient, polymeric liquid is introduced through the fluid inlet and fills the cavities surrounding the article to form a resilient polymeric coating bonded to the outer surface of the article. The coating terminates in annular resilient flange portions that extend radially on the end portions of the article.

The seal members are threadedly secured to the end portions of the article to be coated and position the article within the overlying cavities of the upper and lower shell portions. With this arrangement, an annulus is formed surrounding the article between the metal substrate of the article and the surface of the shell cavity. The fluid inlet extends into the annulus and with the seal members secured in sealing relation with the end portions of the article the annulus is filled with the polymeric liquid. In this manner, an insulating, moisture resistant, resilient polymeric coating is formed on the metal substrate of the article.

One of the seal members is secured to the threaded end portion of the article, which may include a standard fitting such as an elbow connector for coupling conduits. The seal member surrounds the entire section of the threaded end portion and is positioned in abutting relation with the tubular body portion of the article. The seal member includes a tapered end portion which forms with the shell cavities a radially extending annular flange portion. The liquid polymeric material fills the annular flange portion to form a radially extending polymeric coating surrounding the end portion of the article.

The other seal member is threadedly secured to the opposite threaded end portion of the article and includes a recess portion that abuts the threaded end portion of the article. With this arrangement, an annulus is formed between the shell cavities and the metal substrate with the annulus terminating in a radially extending portion that overlies the threads of the fitting end portion. The liquid polymeric material is injected into the fluid inlet and fills the annulus formed around the article. The polymeric liquid upon curing forms an insulating, moisture resistant, resilient polymeric coating on the metal substrate. The radially extending annular flange portions of the coating may thus expose all the threads on one end of the article and cover a portion of the threads on the other end portion. By positioning a seal member in abutting relation with the threaded end portion of the article, an annular flange is formed on a portion of the threads thereof regardless of the length of the threaded end portion. This assures that a seal will be formed on the threaded end portion of the fitting.

Accordingly, the principal object of the present invention is to provide a molding apparatus for forming an insulating, moisture resistant, resilient polymeric coating on the surface of an irregularly sized article.

Another object of the present invention is to provide a molding apparatus for forming a polymeric coating, such as polyvinylchloride, on the surface of a threaded connector in which the coating terminates in radially extending annular flange portions that overlie the threaded end portions to form an effective moisture and dust resistant seal between the threaded end portion of the connector and a conduit secured thereto.

A further object of the present invention is to provide a molding apparatus for forming an insulating, moisture resistant, resilient polymeric coating on the metal substrate of a connector having threaded end portions in which a radially extending annular flange is formed around the threaded end portions regardless of tolerances in the length thereof.

These and other objects and advantages of the present invention will be more completely described and disclosed in the following specification, the accompanying drawings and the appended claims.

DESCRIPTION OF THE PREFERRED EMBODIMENTS

Figure 1:
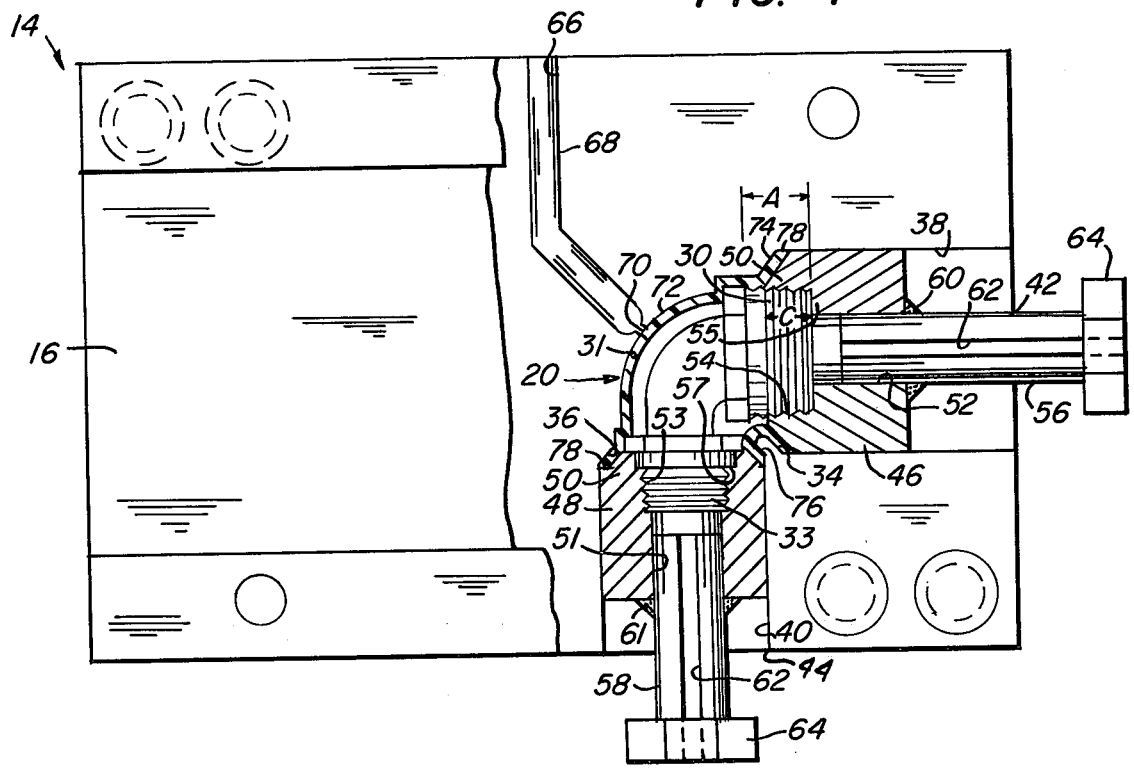
FIG. 1 is a fragmentary view of a shell portion of the mold apparatus with the article to be coated positioned within the mold cavity, illustrating the moisture resistant polymeric coating bonded to the metal substrate and having a flange portion extending radially from the threaded end portion of the article to form a seal thereon.
Figure 2:
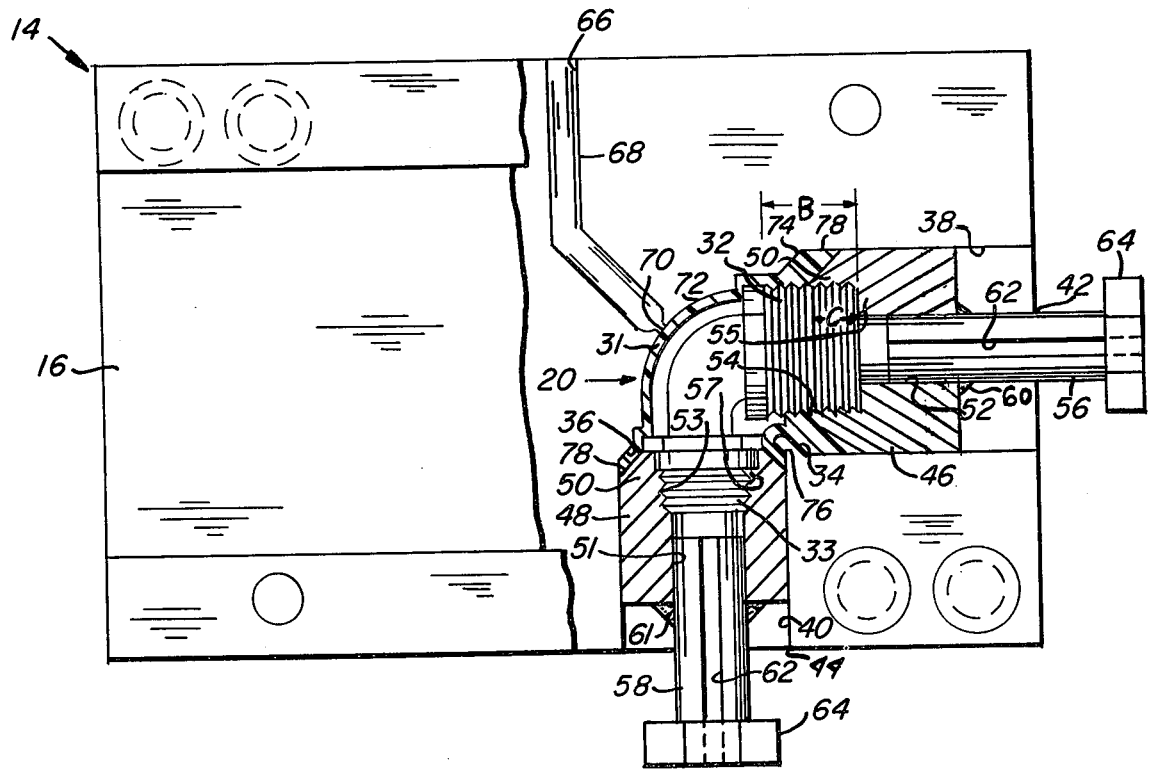
FIG. 2 is a fragmentary view of a shell portion of the mold apparatus similar to FIG. 1, illustrating the radial flange seal portion of the moisture resistant polymeric coating formed on the threaded end portion of the article.
Figure 3:
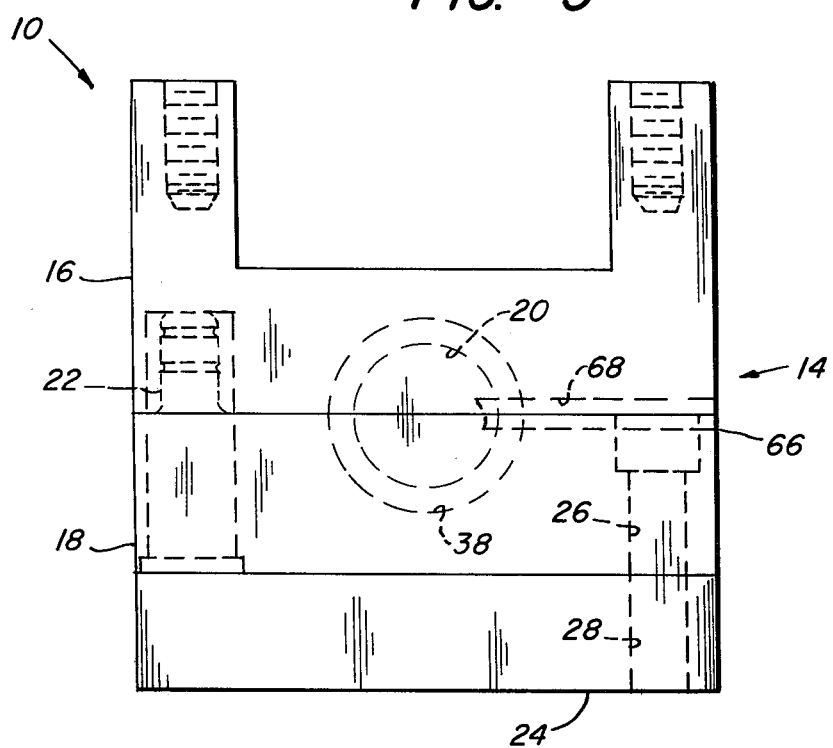
FIG. 3 is a view in side elevation of the shell upper and lower portions that form the mold apparatus of the present invention.

Referring to the drawings there is illustrated a molding apparatus generally designated by the numeral 10 for forming an insulating moisture resistant, resilient polymeric coating on the metal substrate of an irregularly sized article, such as an elbow connector 12, as illustrated in FIGS. 1 and 2, having threaded end portions of a length which may vary within commercial tolerances. The molding apparatus 10 includes a shell 14 having an upper portion 16 and a lower portion 18 as illustrated in FIG. 3. Each of the shell portions 16 and 18 have a mold cavity 20 that conforms with the configuration of the connector 12 to be coated. The mold cavity 20 of each of the shell upper and lower portions 16 and 18 has an identical configuration.

As illustrated in FIG. 3, the mold portions 16 and 18 are secured together by suitable fastening means 22 to position the respective mold cavities 20 in overlying abutting relationship. In this manner, the connector 12 to be coated in accordance with the practice of the present invention is retained within the shell 14 and surrounded by the mold cavity 20. A mold base 14 supports the mold shell lower portion 18 which is secured thereto by a suitable threaded member (not shown) that extends through aligned bores 26 and 28 in the mold lower portion 18 and the mold base 24 respectively.

In the embodiment of the present invention illustrated in FIG. 1, the connector 12 to be coated with an insulating, moisture resistant, resilient polymeric coating has a threaded end portion 30 of a length A which may exceed accepted tolerances as a consequence of the casting process the threaded end portion 32 of a length B for the same connector 12, illustrated in FIG. 2. The connector 12 illustrated in FIGS. 1 and 2 is shown having a second threaded end portion 33 of equal length and a diameter less than end portions 30 and 32. The connector end portions are arranged to threadedly engage the threaded end portions of conduits (not shown) and thereby couple the conduits by the connector 12. By applying a polymeric coating with the molding apparatus 10 to the surface of connector 12, an effective insulating, moisture resistant, resilient seal is provided between the end portions of the connector and the respective conduits connected thereto regardless of variations in the length of the connector end portions.

The shell portions 16 and 18 illustrated in FIG. 3 are mirror images of each other; therefore, references will be made to only shell portion 16 for purposes of illustration in FIGS. 1 and 2. The mold cavity 20 of the shell portion 16 has a configuration which adheres substantially to the configuration of the connector 12 but with dimensions greater than the connector 12 to provide an annulus 31 surrounding the connector. The annulus 31 is to be filled by a suitable polymeric liquid to form the insulating, moisture resistant, resilient polymeric coating on the surface of the connector 12 in accordance with the practice of the present invention. It is to be understood, therefore, that the configuration of the mold cavity 20 may conform to any desired configuration as determined by that of the irregularly sized article to be coated. The mold cavity 20 flares outwardly to form end portions 34 and 36 having diameters which exceed the diameter of the central portion of the mold cavity. Passageways 38 and 40 extend from the cavity end portions 34 and 36 to openings 42 and 44 respectively in the shell portion 16.

Seal members 46 and 48 extend through the openings 42 and 44 and are positioned in the passageways 38 and 40 in surrounding relationship with the connector end portions 30–32 and 33 to thereby close the mold cavity 20. Each of the seal members 46 and 48 has an outer diameter equal to the diameter of the respective passageways 38 and 40. The seal members include a tapered end portion 50 that extends from the respective passageways to the surface of the threaded end portions of the elbow connector 12 at an angle substantially equal to the angle of flared end portions 34 annd 36 of the mold cavity 20. In this manner, the annulus 31 surrounding the connector 12 is sealed by the members 46 and 48.

The seal member 46 includes an axial bore 52 that extends therethrough with an expanded threaded portion 54 at the tapered end portion 50. The expanded bore portion 54 has an internally threaded surface of a length C for threaded engagement with the externally threaded connector end portions 30 and 32. The threaded bore 54 terminates in an annular shoulder 55 that surrounds axial bore 52. The seal member 48 for the threaded end portion 33 also is provided with an axial bore 51 extending therethrough having a threaded portion 53 that engages the end portion 33. The seal member 48 has a shoulder 57 that abuts the body portion of the connector 12 when the member 48 is advanced on the end portion 33 to engage all the threads thereon. To facilitate the threaded engagement of the seal members 46 and 48 with the respective connector end portions 30–32 and 33 and the insertion and removal of the seal members in and out of the mold cavity 20, rod members 56 and 58 are secured by weldments 60 and 61 within the seal member bores. The rod members 56 and 58 are retained within the bores in spaced relation to the threaded portions 54 and 53 of seal members 46 and 48 respectively. An axial ventilation passageway 62 extends through each of the rod members 56 and 58 and a suitable fastener member, such as nut 64, is secured to the end portion thereof. With this arrangement, the seal members 46 and 48 are inserted in the openings 42 and 44 and advanced through passageways 38 and 40 into threaded engagement with the connector end portions by rotation of the nuts 64. The seal member 46 is advanced on the threaded end portions 30 and 32 of connector 12 as illustrated in FIGS. 1 and 2 until the shoulder 55 abuts the end of the threaded end portion 30. The member 46 thus seals the passageway 38 in the mold cavity 20 and is retained in spaced relation with the flared mold surface 34 to form a radially extending annulus between the end of seal member 46 and mold surface 34. Even though the connector end portions 30 and 32 may be unequal in length as illustrated by dimensions A and B, the abutting relation of the seal shoulders 55 with the connector end portions assures that the annular portion 34 of the mold cavity 20 will be sealed. In a similar arrangement, the seal member 48 is advanced on the threaded end portion 33 of connector 12 illustrated in FIGS. 1 and 2 so that shoulder 57 abuts the body portion of connector 12. Thus, the annular portion 36 of mold cavity 20 is sealed by seal member 48.

The upper and lower portions 16 and 18 of the shell 14 are provided with a fluid inlet 66, and a runner 68 extends from inlet 66 through the body portion of the shell 14 into the mold cavity 20 surrounding the article 12 to be coated. The runner 68 terminates in a gate portion 70 that communicates with the mold cavity 20. With the mold cavity 20 closed by the seal members 46 and 48, a liquid polymeric material is introduced into the fluid inlet 66 and the runner 68. The liquid flows through the runner 68 and passes through the gate portion 70 into the annulus 33 surrounding the surface of the connector 12. The liquid preferably comprises a synthetic polymeric composition such as polyethylene, polypropylene, polyvinylchloride, styrene-butadiene, copolymer, and similar flexible polymeric compositions. The liquid completely fills the annulus 31 surrounding the connector elbow 12 and formed by the mold cavity 20 and the seal members 46 and 48.

Upon curing the polymeric liquid is bonded to the metal substrate to form an insulating, moisture resistant, resilient polymeric coating 72. The polymeric coating 72 terminates adjacent the connector threaded end portions 30-32 and 33, illustrated in FIGS. 1 and 2, in annular seal portions 74 and 76 that extend radially of the threaded end portions 30-32 and 33 to provide a radial seal therearound. The annular seal portions 74 and 76 each terminate in an outer peripheral annular edge portion 78 that surrounds the threaded end portions of the connector 12.

As illustrated in FIG. 1, the annular seal edge portion 74 surrounding the connector threaded end portion 30 terminates approximately intermediate the connector threaded end portion 30 of length A. On the other hand, as illustrated in FIG. 2 for the connector 12 having the threaded end portion 32 of length B which is greater than the length A, the annular seal portion 74 extends approximately to the end of the connector. Therefore, regardless of the variation which may occur in the length of the connector threaded end portion, an annular seal is formed by the engagement of the seal member 46 on the threaded end portion. The formation of the radially extending seal portion is assured by advancing the member 46 on the end portions 30 and 32 such that the shoulder 55 is in abutting relation with the end of the connector. With the dimension C of the threaded bore 54 of seal member 46 fixed in relation to the variable dimensions A and B, a radially extending annular seal portion will be formed on the connector.

The resilient annular seal portion 76 formed on the threaded end portion 33 of the connector by the seal member 48 terminates rearwardly of end portion 33 on the body of the connector. A seal portion of this configuration is formed by the abutting relation of shoulder 57 of the seal member with the body of the connector. The seal member 48 is advanced on the threaded end portion 33 until the end portion of the seal member contacts the body of the connector. Thus, with the seal member 48 completely engaging all the threads of the end portion 33, the annular seal portion 76 is positioned rearwardly of the threaded end portion and extending outwardly from the body of the connector 12.

When the polymeric coating 72 surrounding the elbow connector 12 has fully cured, the upper and lower portions 16 and 18 of the shell 14 are disengaged to permit removal of the coated article from the mold cavity 20. In the event the polymeric coating 72 should stick to the mold cavity 20, the application of a suitable force to the fastener members 64 on the end portion of the rod members 56 and 58 will dislodge the coated connector from the mold cavity 20. With the connector 12 removed from the mold cavity 20, rotation of the nuts 64 on the rods 56 and 58 removes the seal members 46 and 48 from threaded connection with the end portions 30-32 and 33.

With the resilient polymeric coating 72 applied to the metal substrate of the elbow connector 12 by the above-described molding apparatus 10, conduits to be coupled by the connector are threadedly positioned on the connector end portions. The conduits are advanced on the threaded end portions into abutting relation with the annular seal portions 74 and 76 to effect an insulating, moisture resistant seal between the connector 12 and the conduits. Not only do the annular flange portions 74 and 76 and the coating 72 provide an insulating moisture resistant seal surrounding the connection of the conduits, but they also serve to prevent the entry of dirt between the members. The structural strength of the resilient polymeric protective coating 72 and each of the flanges 74 and 76 is capable of resisting impact stresses applied to the elbow connector 12 during field installation. In addition, the annular flange portions 74 and 76 electrically insulate the threaded connection between the elbow connector 12 and the conduits.

According to the provisions of the patent statutes, I have explained the principle, preferred construction and mode of operation of my invention and have illustrated and described what I now consider its best embodiments. However, it should be understood that, within the scope of the appended claims, the invention may be practiced otherwise than as specifically illustrated and described.

I claim:
1. In a molding apparatus for applying a protective coating to an irregularly sized article comprising,
a shell having upper and lower body portions,
said upper and lower shell portions each having a cavity of a preselected configuration to receive an article for coating, a fluid inlet extending through said shell into said cavities, connecting means for securing together said upper and lower shell portions to position said cavities in overlying relation and surrounding an article to be coated, said secured shells provide a mold cavity and openings extending through said respective shell portions into said mold cavity, seal means for sealing said openings in said mold cavity, an article to be coated housed within said mold cavity and carrying therewith said seal means on its end portions being secured to the end portions of the article to be coated within said cavities to retain the article in spaced relation with said shell portions and to form an annular molding surface which surrounds the article and terminates adjacent the end portions thereof in radially extending annular portions, a moisture resistant, resilient polymeric liquid adapted to be introduced through said fluid inlet to fill said cavity and occupy the annular molding surface thus surrounding the article and forming a resilient polymeric coating on the surface of the article, and providing annular resilient portions extending radially on the end portions of the article.

2. In a molding apparatus for applying a protective coating to an irregularly sized article as set forth in claim 1 which includes, means secured to said seal means and extending from said openings in said shell upper and lower body portions for positioning said seal means in sealing relation with the article in said mold cavity such that said coating formed on the article extends radially from the end portions thereof a distance determined by the annular mold surface due to the position of said seal means on the end portion of the article.

3. In a molding apparatus for applying a protective coating to an irregularly sized article as set forth in claim 1 which includes, a rod member nonrotatably secured to said seal means for positioning said seal means in said openings in said shell upper and lower body portions to rigidly position the article to be coated within said mold cavity and seal said cavity to prevent the flow of said polymeric liquid therefrom, and a fastener member secured to the end portion of said rod means and positioned externally of said openings in said shell upper and lower body portions to facilitate the entry and removal of said seal members from sealing relation with said cavities.

4. In a molding apparatus for applying a protective coating to an irregularly sized article as set forth in claim 1 in which said seal means includes, a seal member having an axial bore extending therethrough and a tapered end portion, said axial bore having an expanded threaded portion for engagement with the end portion of the article in said cavities, said expanded threaded portion having an annular shoulder, and said annular shoulder positioned in abutting relation with the end portion of the article to position said tapered end portion in spaced relation with said shell upper and lower body portions to form a molding annulus extending radially outwardly from the end portion to the article for receiving said polymeric liquid.

5. In a molding apparatus for applying a protective coating to an irregularly sized article as set forth in claim 1 in which said seal means includes, a seal member having an axial bore extending therethrough and a tapered end portion, said axial bore having a threaded portion for engagement with the end portion of the article to be coated in said mold cavity, and said seal member being positioned on the end portion of the article such that said tapered end portion and said shell upper and lower body portions form a molding annulus for receiving said polymeric liquid.

6. In a molding apparatus for applying a protective coating to an irregularly sized article as set forth in claim 1 which includes, said seal means engaged in sealing relation with the end portion of the article to be coated to close said openings and retain the article in said cavities in spaced relation with said shell upper and lower body portions to form a molding annulus surrounding the article and terminating adjacent the end portions of the article to provide a radially extending annular portion for receiving said polymeric liquid.

7. In a molding apparatus for applying a protective coating to an irregularly sized article as set forth in claim 1 which includes, passageways extending through said shell upper and lower body portions to connect said openings therein with said cavities, and said seal means extending into said passageways to seal said cavities from said openings.

8. In a molding apparatus for applying a protective coating to an irregularly sized article as set forth in claim 1 which includes, said polymeric liquid selected from the group consisting of polyethylene, polypropylene, polyvinylchloride, and styrene-butadiene.

* * * * *